I. RITTENHOUSE.

PIN PAPER FASTENER.

APPLICATION FILED DEC. 23, 1912.

Reissued May 9, 1916.

14,130.

Inventor

Irvin Rittenhouse.

Witnesses

G. M. Eastwood.

Edward D. White.

By

Clark Prentiss & Clark.

Attorney

UNITED STATES PATENT OFFICE.

IRVIN RITTENHOUSE, OF WASHINGTON, DISTRICT OF COLUMBIA, ASSIGNOR TO HORACE F. CLARK, OF WASHINGTON, DISTRICT OF COLUMBIA.

PIN PAPER-FASTENER.

14,130. Specification of Reissued Letters Patent. Reissued May 9, 1916.

Original No. 920,393, dated May 4, 1909, Serial No. 480,467. Application for reissue filed December 23, 1912. Serial No. 738,390.

*To all whom it may concern:*

Be it known that I, IRVIN RITTENHOUSE, a citizen of the United States, residing at Washington, in the District of Columbia, have invented certain new and useful Improvements in Pin Paper-Fasteners, of which the following is a specification.

This invention relates to paper fasteners and more particularly to that type known as pin fasteners, and has for its object to provide a fastening means by which a number of papers may be detachably secured together for the purpose of filing.

This invention comprises in brief a base member having pin fastening means cooperating therewith, said pin fastening means being bent over the edges of the base member. The papers desired to be secured by the fastener are placed over the bent up ends of the pin fastening means and an additional securing means in the form of a washer or plate having apertures therein is placed over the outermost sheet and the said bent up ends are bent downwardly to engage the paper.

This object is attained by the device illustrated in the accompanying drawing in a preferred form, yet it is to be understood that minor detail changes may be made without departing from the spirit of the invention, as defined by the appended claims.

Figure 1:
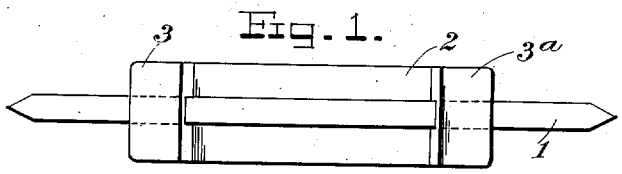
Figure 2:
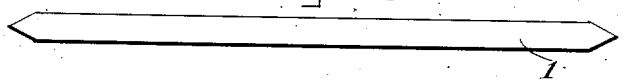
Figure 2:
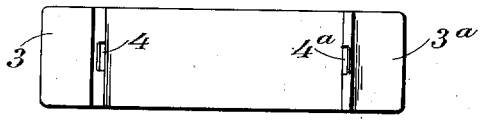
Figure 3:
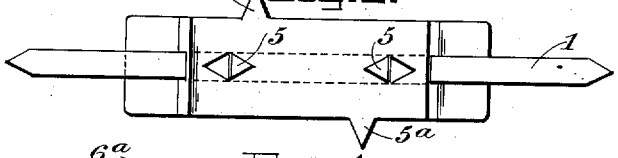
Figure 4:
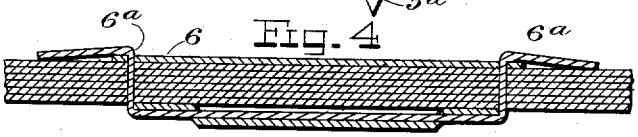
Figure 5:
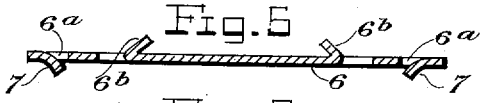
Figure 6:
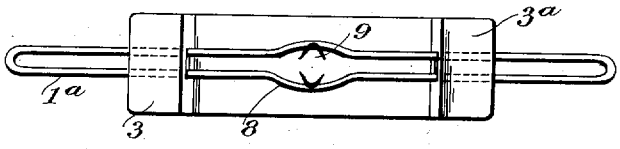
Figure 7:
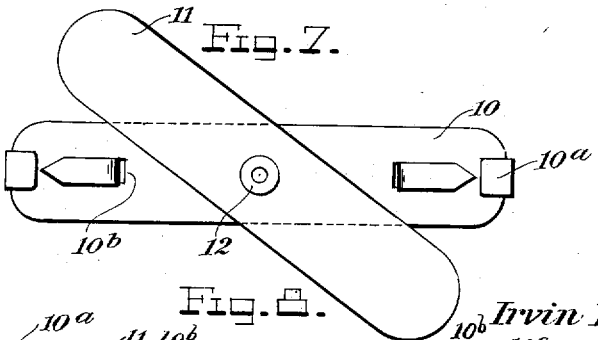
Figure 8:
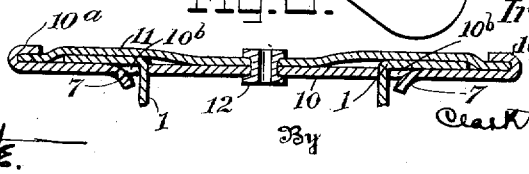

Figure 1 is an upper plan view of the base member and the pin fastening means, in accordance with this invention; Fig. 2 is a view similar to Fig. 1 showing the base and pin fastener separate; Fig. 3 is a bottom plan view of a modified form of base showing the pin fastener inserted therein; Fig. 4 is a transverse sectional view, showing the fastener securing a number of papers; Fig. 5 is a view in longitudinal section of a modified form of washer; Fig. 6 is a plan view of a modified form of clip; Fig. 7 is a plan view of another modified form of washer; Fig. 8 is a longitudinal section of Fig. 7.

1 represents the pin fastener, which is preferably a long narrow strip of suitable flexible metal.

2 indicates the base member preferably constructed of non-flexible metal.

3 and $3^a$ are the end portions of the base struck up from the main body and extending parallel therewith.

4 and $4^a$ are apertures in the angular portion between the main body of the base and the struck up end portions. These apertures are of sufficient size to receive the pin fastener 1.

The operation of my fastener is as follows: The pin fastener and base are assembled by inserting the pin fastener through the apertures 4 and $4^a$ and the ends of the pin are then bent up over the ends of the extensions 3 and $3^a$ in a position at right angles to the base. The fastener is then ready to receive the papers to be secured thereby. The papers may be previously punched if desired, otherwise, the pointed ends of the pin fastener are sufficient to pierce them, and the papers are placed over the ends of the pin fastener in the order desired. To prevent the tearing of the outermost sheet, a metallic washer 6 having apertures $6^a$, adapted to receive the ends of the pin fasteners, is then placed over the top sheet and the fasteners bent down to engage the paper.

Fig. 3 shows a modified form of base member having projections 5 and $5^a$ on the back or edges thereof arranged to secure a backing for the papers, an index sheet, or the like.

In the modified form of washer, as shown in Fig. 5, the metal nearest the ends of the apertures $6^a$ is struck up as at 7 to form a curved rest for a pin fastener. When the washer is placed over the ends of the pin fasteners the projections 7 are on the under side, and also act as a guide for the pin fasteners in finding the apertures $6^a$.

$6^b$ are struck up prongs on the upper side of the modified form of washer, as shown in Fig. 5, and are adapted to secure a label, facing sheet, or the like.

A modified form of clip is shown in Fig. 6 in which a double wire $1^a$ is substituted for a flat metal pin fastener 1. To the middle portion of the wires a slight curve 8 is imparted and the nibs 9 may be struck up over the base 1 to engage the curved portion 8 of the wire to secure in position the fastener $1^a$.

A further modification of washer is illustrated in Figs. 7 and 8. In this form the washer plate 10 extends a considerable distance on each side of the pin openings $10^b$. 11 is a protecting plate corresponding in size and shape to washer 10 and centrally pivoted thereto at 12. Each end of washer 10 is provided with bent over portions $10^a$ arranged to engage the ends of plate 11. The pin openings $10^b$ are provided with downwardly projecting portions 7 to assist the pin openings in locating the receiving openings $10^b$. The plate 11 is swung to the position shown in Fig. 7, the pin fasteners pass through the openings provided therefor in the washer, bent outwardly as shown, the plate 11 moved to cover washer 10, and then all the parts will be held secured by the bent over portions $10^a$ and engaging plate 11.

What is claimed is:—

1. A paper fastener comprising an elongated base member having a main body and struck up end portions extending parallel therewith, the angular portion between the main body and end portions provided with apertures, a removable pin fastener adapted to be inserted through said apertures and bent up over the ends of the struck up portions.

2. In a device of the character described, a base member having struck up end portions to extend parallel therewith, the bent portions provided with apertures, and a fastening pin composed of a continuous piece of wire bent upon itself to form a fastener adapted to be inserted through said apertures and bent up over the ends of the struck up portions.

3. In a device of the character described, a base member having struck up end portions to extend parallel therewith, the bent portions provided with apertures, and a fastening pin comprising a continuous piece of wire bent upon itself and having its ends fastened together, adapted to pass through said apertures and those parts of the wire between the apertures bent away from each other for a portion of their length, and nibs provided on the base to engage the bent portions of the wire.

4. A paper fastener, comprising an elongated base member having a main body and struck up end portions extending parallel therewith, the angular portion between the main body and end portions provided with apertures, a removable pin fastener adapted to be inserted through said apertures and above the main body, said pin being bent up over the ends of the struck up portions.

5. In combination with a paper fastener including tongues, a retaining member for engaging the tongues in a bent state when passed therethrough, keepers formed at each end of the member and overlying the same, and a plate pivoted to the member for covering the bent ends of the tongues, the ends of said plate being adapted to engage the keepers when said plate is swung in line with said retaining member.

6. In a device of the class described, a base member, a fastening pin comprising a single length of wire bent upon itself and extending longitudinally of the base, the strand forming the pin having its sides spaced, and nibs carried by the base member for engaging the sides of the pin.

7. A paper fastener comprising an elongated base member having a main body portion and struck up end portions extending parallel therewith, the main body being flat throughout its length, the angular portion between the main body and the end portions being provided with apertures, a removable pin fastener adapted to be inserted through the apertures and bent up over the ends of the struck up portions, the latter projecting permanently outward from the main body.

8. A paper fastener comprising an elongated base member having a main body and struck up end portions extending parallel therewith, the main body being flat throughout its length, the angular portion between the main body and the end portions being provided with apertures, a removable pin fastener adapted to be inserted through the apertures above the main body, said pin being bent up over the ends of the struck up portions, the latter projecting permanently outward from the main body.

9. A paper fastener comprising a base member, a washer provided with terminal orifices and with in-struck curved tongues constituting guides and a fastening pin carried by the base member and having its ends adapted to be projected through the washer.

IRVIN RITTENHOUSE.

Witnesses:
EDWARD S. WHITE,
W. E. HUDSON.